United States Patent
Priesett et al.

(10) Patent No.: US 9,213,959 B2
(45) Date of Patent: Dec. 15, 2015

(54) METHOD AND SYSTEMS FOR ANALYZING STOCK DIFFERENCES IN A SUPPLY CHAIN

(75) Inventors: Karsten Priesett, Karlsruhe (DE); Thomas Christ, Kronau (DE)

(73) Assignee: SAP SE, Walldorf (DE)

( * ) Notice: Subject to any disclaimer, the term of this patent is extended or adjusted under 35 U.S.C. 154(b) by 2285 days.

(21) Appl. No.: 11/516,823

(22) Filed: Sep. 6, 2006

(65) Prior Publication Data

US 2008/0059344 A1 Mar. 6, 2008

(51) Int. Cl.
*G06Q 10/08* (2012.01)
*G06Q 40/00* (2012.01)
*G06Q 10/06* (2012.01)

(52) U.S. Cl.
CPC ............. *G06Q 10/087* (2013.01); *G06Q 40/12* (2013.12)

(58) Field of Classification Search
CPC . G06Q 10/087; G06Q 10/0637; G06Q 10/08; G06Q 20/203; G05B 19/41865
See application file for complete search history.

(56) References Cited

U.S. PATENT DOCUMENTS

| | | | | |
|---|---|---|---|---|
| 5,953,707 A * | 9/1999 | Huang | .................. | G06Q 10/06 705/7.25 |
| 6,148,291 A * | 11/2000 | Radican | ................. | G06Q 10/08 705/22 |
| 6,212,524 B1 * | 4/2001 | Weissman et al. | ............ | 707/600 |
| 7,006,893 B2 * | 2/2006 | Hart et al. | ..................... | 700/235 |
| 7,175,081 B2 * | 2/2007 | Andreasson et al. | ......... | 235/385 |
| 2003/0018490 A1 * | 1/2003 | Magers et al. | .................... | 705/1 |
| 2003/0083947 A1 * | 5/2003 | Hoffman | ................ | G06Q 10/06 705/22 |
| 2003/0216975 A1 * | 11/2003 | Montey | ................ | G06Q 10/087 705/28 |
| 2003/0233264 A1 * | 12/2003 | Jones et al. | ....................... | 705/8 |
| 2004/0010496 A1 * | 1/2004 | Behrendt | ................ | H04L 67/28 |
| 2005/0156035 A1 * | 7/2005 | Gyi | ...................... | G06Q 20/203 235/385 |
| 2005/0277448 A1 * | 12/2005 | Castaneda | ............... | H04M 1/23 455/575.1 |
| 2006/0036498 A1 * | 2/2006 | Iida et al. | ........................ | 705/15 |
| 2008/0046344 A1 * | 2/2008 | Myers | ................ | G06Q 10/087 705/28 |

* cited by examiner

*Primary Examiner* — Ryan Zeender
*Assistant Examiner* — Dana Amsdell
(74) *Attorney, Agent, or Firm* — Dilworth IP LLC

(57) ABSTRACT

A method and system to perform difference analysis. Differences from various business processes are collected. Those differences are displayed in a graphical user interface. Differences may be posted individually or in aggregate to a reporting system if a set of criteria are satisfied.

21 Claims, 3 Drawing Sheets

FIG. 3

| Differences | Edit | Goto | Environment | Settings | System | Help | | | |
|---|---|---|---|---|---|---|---|---|---|

*Difference Analyzer - Warehouse SPU2*

Display | Find | Product | | Open Advanced Search

Differences / Cumulative

| | Mode | Status | Tolerance | Blocked | CsfmsBlStk | Note Crtd | Product in HU | SN | No. of items | Difference Qty | Unit | Difference Value | Abs. Diff. Value | Crcy | Priority | Prio Des |
|---|---|---|---|---|---|---|---|---|---|---|---|---|---|---|---|---|
| | ✏ | | □ | □ | □ | □ | □ | | 1 | 12 | EA | 95.76 | 95.76 | USC | 2 | MEDIUM |
| | ✏ | ✖ | □ | □ | ☑ | □ | □ | | 1 | 17 | EA | 63.24 | 63.24 | USC | 2 | MEDIUM |
| | ✏ | | □ | □ | □ | □ | □ | | 3 | 18 | EA | 18.00 | 18.00 | USC | 2 | MEDIUM |
| | ✏ | | □ | □ | □ | □ | □ | | 1 | 7 | EA | 2.84 | 2.84 | USC | 2 | MEDIUM |
| | ✏ | | □ | □ | □ | □ | □ | | 1 | 2 | EA | 2.00 | 2.00 | USC | 2 | MEDIUM |
| | ✏ | | □ | □ | □ | □ | □ | | 1 | -1 | EA | -0.94 | 0.94 | USC | 2 | MEDIUM |

Differences on aggregate level

Differences

| | Mode | Status | Tolerance | Blocked | CsfmsBlStk | Note Crtd | Product in HU | SN | Difference Qty | Unit | Difference Value | Abs. Diff. Value | Crcy | Diff/Trgt | Priority | Prio Des |
|---|---|---|---|---|---|---|---|---|---|---|---|---|---|---|---|---|
| | ✏ | ✖ | □ | □ | ☑ | □ | □ | | 8 | EA | 6.00 | 6.00 | USC | 0.00 | 2 | MEDIUM |
| | ✏ | ✖ | □ | □ | ☑ | □ | □ | | 6 | EA | 6.00 | 6.00 | USC | 0.00 | 2 | MEDIUM |
| | ✏ | ✖ | □ | □ | ☑ | □ | □ | | 8 | EA | 6.00 | 6.00 | USC | 0.00 | 2 | MEDIUM |

Differences on individual level

METHOD AND SYSTEMS FOR ANALYZING STOCK DIFFERENCES IN A SUPPLY CHAIN

BACKGROUND

1. Field

Embodiments of the invention relate to supply chain management. More specifically, the embodiments of the invention relate to analysis of stock differences within a supply chain.

2. Background

In supply chain management processes stock differences may occur or can be determined in different contexts, for example, when goods are moved within the warehouse, during physical inventory, during a quality inspection process, and/or resulting against the delivering facility claims from a customer or another facility in the supply chain. This may occur, for example, where the existing record shows X units of a product in bin A and during physical inventory, it is found that Y units are in bin A. These differences may be positive or negative. Commonly, these differences are initially posted on the local level, such as the warehouse management system which eventually must be reconciled to a host reporting system, such as an enterprise resource planning (ERP) system or advanced planning optimizer (APO) system, such as available from SAP AG of Walldorf, Germany. Only after posting to the reporting system are global adjustment of the inventory levels made that can influence global operations, for example, an available to promise (ATP) check.

It is also desirable to minimize the number of postings to the recording system as such postings are reflected on a company's financial statements. Thus, if in the example above the difference between X and Y can be reconciled, such as an adjacent bin expected to have Y units actually has X units of the same product, reconciliation can occur on a local level without a posting to the host system.

SUMMARY OF THE INVENTION

A method and system to perform difference analysis is disclosed. Differences from various business processes are collected. Those differences are displayed in a graphical user interface. Differences may be posted individually or in aggregate to a reporting system if a set of criteria are satisfied.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 3 is a user interface diagram according to one embodiment of the invention.

DETAILED DESCRIPTION

Figure 1:
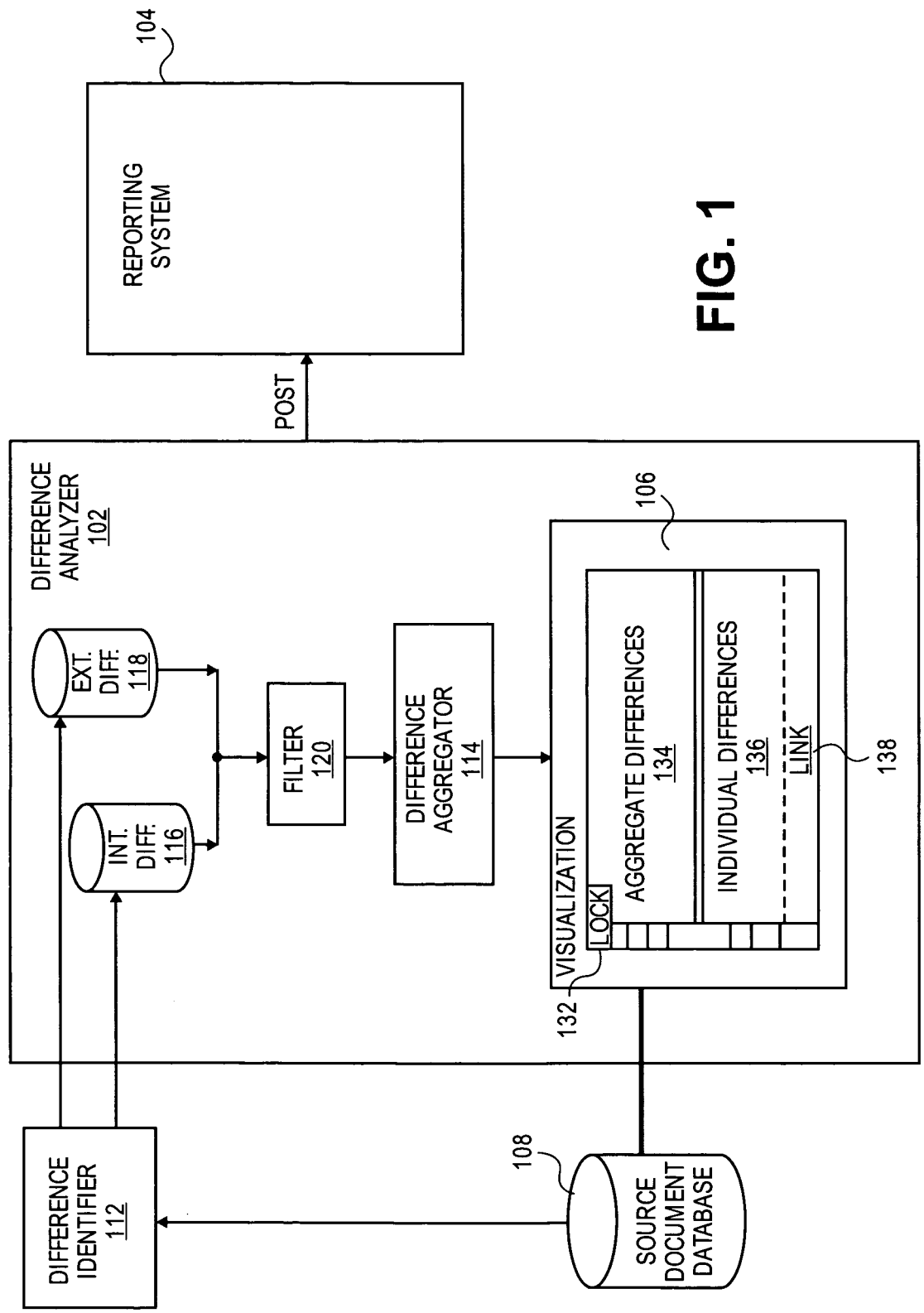
FIG. 1 is a block diagram of a system for difference analysis in accordance with one embodiment of the invention.

FIG. 1 is a block diagram of a system for difference analysis in accordance with one embodiment of the invention. Difference analyzer 102 controls posting of differences to a reporting system 104 and provides a visualization tool 106 to permit a user to visualize and possibly manipulate the differences.

A difference analyzer 102 includes a difference identifier 112 and a difference aggregator 114. Difference identifier 112 identifies incoming difference sources, such as physical inventory, warehouse task confirmations, quality inspection reports, customer claim reports, and the like. The difference identifier 112 then classifies each difference as an internal difference where the source of the difference arises entirely, e.g., within the warehouse, such as physical inventory or an external difference, such as may result from a customer claim. Thus, as used herein, "internal difference" refers to any difference that is solely the result of local activity and an "external difference" is any difference that results from a remote transaction. In one embodiment, external differences or claims enter the system as a special form of a delivery document.

Difference analyzer 102 may include two difference data structures internal difference data structure 116 and external difference data structure 118 to retain a persistent record of the difference identified by difference identifier. Those differences are also passed to difference aggregator 114, which aggregates internal differences and external differences into a cumulative aggregate difference for a particular item having a common set of attributes. In one embodiment, the set of attributes for aggregation is user configurable. That aggregation may then also be retained in internal difference structure or external difference data structure 116 and 118 respectively.

Difference analyzer 102 also provides a visualization tool 106 which allows the aggregate and individual differences from data structure 116 and 118 to be displayed to a user. Difference analyzer 102 may include a filter to allow the differences to be filtered based on various user specified criteria prior to visualization. Visualization tool 106 permits a user to lock various different entries to prevent posting to a reporting system 104. In some embodiments, if the difference is not locked, the difference analyzer 102 may be configured to post the difference to the reporting system 104 after a defined period of time. In one embodiment, an entry is locked by checking the check box in a lock column 132 corresponding to the row of the entry within the visualization tool user interface.

In some embodiments, the visualization tool may include drill down logic that allows a user to go from the aggregate differences to the individual differences and then if desired to the source document from which the difference arose. In some cases the visualization tool may provide a link 138 between a source document database 108 and corresponding differences being displayed. In this context, a user may be able to click on the difference or an icon associated with the difference and retrieve, for example, the warehouse task confirmation that resulted in the difference. In some embodiments, the link to source documents is only active between individual differences and the individual source document that caused the difference. In some embodiments linking is possible on either an aggregate or individual level. Thus, in the context of an aggregate difference, a list of multiple source documents may first be presented. A user may then drill down to a single document to be retrieved from source document database 108 in response to actuation of a link in the list.

Figure 2:
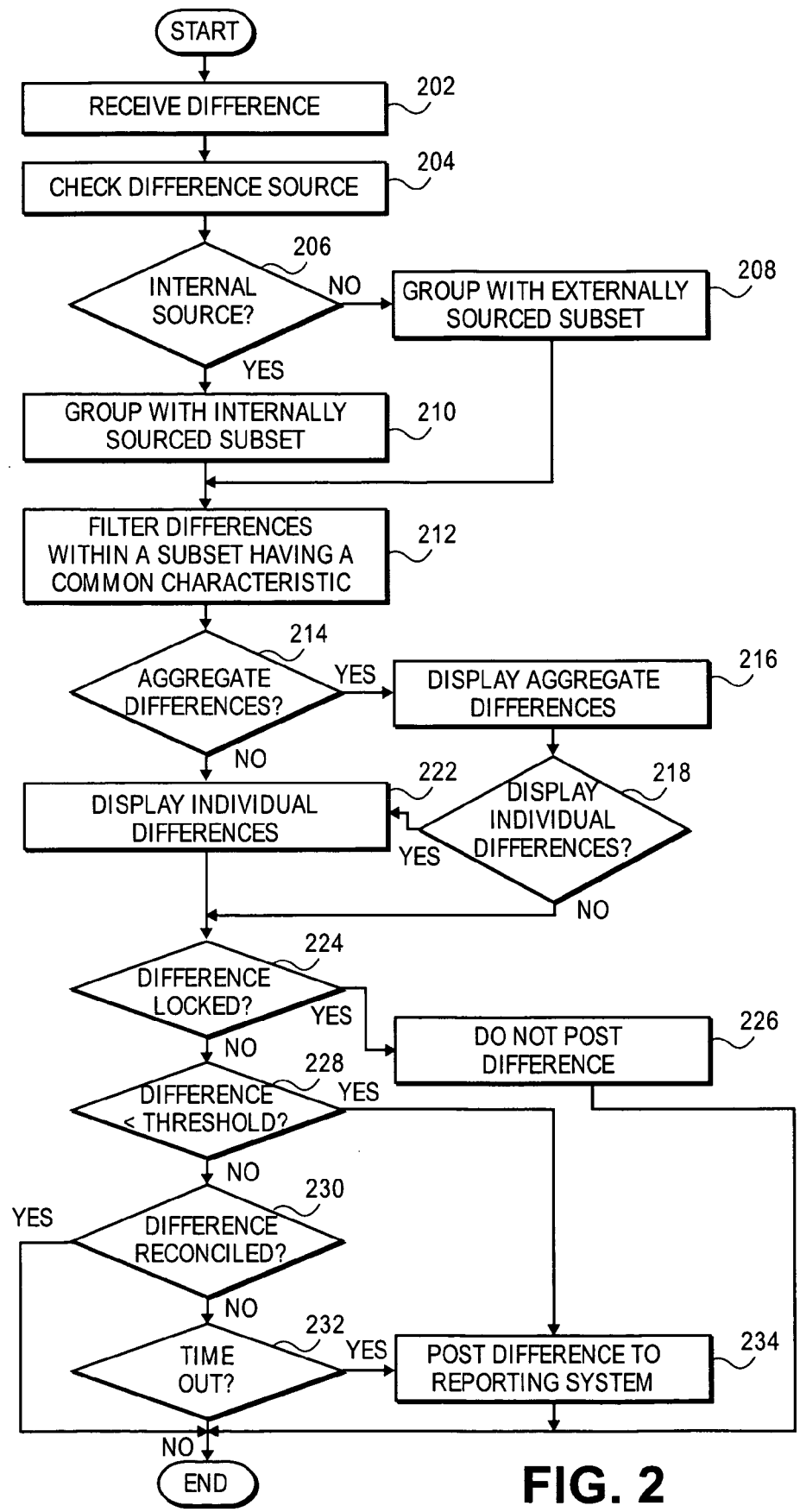
FIG. 2 is a flow diagram of operations on a system of one embodiment of the invention.

FIG. 2 is a flow diagram of operations on a system of one embodiment of the invention. At block 202 a difference is received. At block 204 the system checks the source of the difference. At block 206, a determination is made if the source is internal. If the source is not internal, the difference is grouped with the subset of differences that are externally sourced at block 208. If the source is internal, the difference is grouped with the internally sourced subset at block 210. At block 212, the difference data is filtered based on specified criteria. In some embodiments, it is possible to specify no criteria in which case the differences are effectively unfiltered.

At block 214, a determination is made whether it is desired to aggregate the differences for display. If not, at block 222, individual differences are displayed. If aggregation is desired at block 216, the difference is aggregated with a subset having common characteristics. For example, the difference of product A externally sourced would be grouped with the subset of differences having the attributes product A and internally sourced. In some embodiments, subsets of differences having common characteristics may be grouped together. A determination is then made at block 218 if it is desired to display individual differences. If individual differences are desired, they may be displayed concurrently with the aggregate differences at block 220. In some embodiments, individual differences are displayed only for a selected subset of the aggregate differences.

At block 224, determination is made on an individual basis whether the difference is locked. If the difference is locked, the system is prevented from posting the difference to the reporting system at block 226 as long as the lock is maintained. If the difference is not locked and the difference is greater than a threshold, a determination is made at block 230 if the difference has been reconciled. If the difference has been reconciled, no need to post the difference exists.

At block 232, if the difference has not been reconciled, a determination is made if a timeout has occurred. If a timeout has occurred, or if the difference is less than the threshold at block 228, it can be posted to the reporting system automatically at block 234. The amount of time before a timeout may be set to minimize the impact on global operations, such as ATP. Thus, it may be set at different levels for difference products, or different valuations of differences. For example, high demand product in a just in time inventory system may have a shorter timeout time than a lower demand product having a larger amount of safety stock. The timeout time may also be adjusted, for example, where special circumstances, such as a product promotion may effect demand.

Similarly, in some embodiments, threshold for the block 228 determination may be set at any level. For example, it could be set at zero to prevent any automatic posting before the timeout occurs. Alternatively, it may be set at a non-zero level that is a value, such that the cost of tracking down the difference is likely to exceed the recovered value, e.g., $5, $10, etc., as appropriate to the environment. In this manner, material unnecessary postings to the reporting system may be avoided.

In the preceding description, a particular order of flow is described. However, one should recognize that the precise flow order may vary in different embodiments, some operation may be implied and some may be executed in parallel. All of those options are within the scope of different embodiments of the invention.

FIG. 3 is a user interface diagram according to one embodiment of the invention. Interface displays aggregate differences 334 and individual differences 336 in separate regions of the graphical user interface (GUI). The GUI may provide searching and sorting individually. The GUI may also permit a user to specify filter criteria. In some embodiments, the filter criteria may be made persistent. For example, a user may specify he or she never wants to see differences below a certain value. In one embodiment, the differences are displayed in tables with each row corresponding to differences for items having a common stock key in the aggregates table and individual differences from a single source in the individual differences table. Items having a common stock key typically possess a common set of attributes, e.g., a stock key applies to a single product with a bundle of common characteristics (e.g. batch) handled as a unit.

Each table may include various columns that provide information about the difference. In one embodiment a "mode" column 340 indicates whether the difference is in a viewing mode or an editing mode. A status column 342 indicates whether the user can post the difference to the reporting system. Different levels of users may have different rights to post set at different valuation levels. The tolerance column 344 indicates whether the monetary threshold that allows the user to post a difference has been exceeded. Number of items column 348 only appears in the aggregates table and indicates the number of individual differences accumulated to form that entry. The priority designation column 350 identifies the priority of the difference resolution and may impact the time before the difference will be automatically posted to the reporting system.

In the shown embodiment, individual differences displayed in region 336 correspond to a selected aggregate difference for region 334. For example, here row 320 has been selected, and individual differences 322, 324 and 326 which are components of the aggregate difference in row 320, are displayed in the individual difference region 334 of the GUI.

Various soft buttons are provided to permit the user to manipulate the differences on either aggregate or individual basis. A "Post" soft button 302 in the aggregate level permits the user to immediately post selected entries to the reporting system by first selecting the entry and then actuating the post button 302. Posting the aggregate entry rather than individual entries desirably reduces the number of postings to the reporting system. However, in some embodiments, a soft button 310 is also provided to permit the user to post individual entries in the event that it is desired for a particular business purpose.

In one embodiment, entries can be locked on an aggregate basis by checking the corresponding box in the "blocked" column of, for example, row 320. Similarly, checking the box in the "blocked" column of rows 322, 324, and 326 permits locking on an individual basis. In one embodiment, locking on an individual basis, any difference automatically locks the aggregate entry. Similarly, in one embodiment, locking the aggregate entry automatically locks all of the individual entries. Actuating a lock button 304 or 308 in one embodiment causes the system to generate a dialogue box or popup window to allow a user to enter the reason the selected entry is to be locked. This text may then be associated with the record in the data structure for that difference.

On an individual level, it is possible to correct differences by actuation of the correction button 306. In response to actuation correction button the system will generate a dialogue box to permit a user to correct a difference within the system. The dialogue box may request for example difference quantity; other information, such as document number, item number, number of units and any other information required to effect the desired correction may be obtained automatically from the source document. Any correction entered on the individual level is automatically propagated through the aggregate level and reflected in the aggregate difference within the user interface. One common reason why a correction may be desirable is where the difference disappears as a result of for example a research that "finds" the missing difference. In this context neither posting nor reconciliation is required.

Comment button 312 when actuated causes the system to open a dialogue box popup window to permit a user to enter a note to be associated with the particular difference. This note may be of an arbitrary form, but, for example, might explain the context of a claim why the claim was accepted or rejected. As another example, the note may indicate the progress of the difference analysis. Other types of notes are also possible. In one embodiment, comments can be used to initiate a workflow. For example, where a user investigating a difference has insufficient rights to post the difference, using a comment to save the research results may initiate a workflow for a second user with greater posting rights.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   collecting inventory quantity differences, in a computer, the inventory quantity differences identified in one or more business processes;
   displaying the collected inventory quantity differences within a graphical user interface, the graphical user interface providing a link between a difference entry and a source document from which the difference was collected; and
   posting at least one difference to a reporting system if at least one defined criterion is met.

2. The method of claim 1 wherein collecting comprises:
   segregating internally identified differences into a first subset; and
   segregating externally identified differences into a second subset.

3. The method of claim 1 wherein displaying comprises:
   aggregating differences having a common set of attributes as a single line entry in the display.

4. The method of claim 3 wherein posting comprises:
   posting the aggregate difference to the reporting system.

5. The method of claim 3 wherein displaying further comprises:
   displaying individual differences as well as the aggregate difference.

6. The method of claim 1 further comprising:
   filtering the differences collected; and
   displaying only a filtered subset of the differences.

7. The method of claim 1 further comprising:
   identifying if the difference exceeds a threshold; and
   automatically posting differences that do not exceed the threshold.

8. The method of claim 1 further comprising:
   locking a difference entry to prevent posting of the difference.

9. An apparatus comprising:
   a difference identification module to identify a difference between inventory quantity on record and inventory quantity reflected in one or more business documents;
   difference aggregation logic to collect differences identified, wherein the aggregation logic combines inventory differences having a common set of attributes; and
   a graphical user interface (GUI) to provide a visualization of the differences, wherein the GUI includes a first display area to display an aggregation of differences having a common set of attributes, and a second display area to display individual differences.

10. The apparatus of claim 9 further comprising:
    a filter to filter the differences based on selected attributes.

11. The apparatus of claim 9 further comprising:
    locking logic to lock one or more entries in the GUI to prevent posting of the entry to an entity-wide reporting system.

12. The apparatus of claim 9 wherein the GUI further comprises:
    a plurality of soft buttons to permit manipulation of one or more entries in the first display area and the second display area.

13. The apparatus of claim 9 wherein the GUI comprises:
    drill down logic to permit access to a difference source document.

14. The apparatus of claim 9 wherein the GUI permits a first user to initiate a workflow for a second user.

15. A non-transitory machine-accessible medium containing instructions that, when executed, cause a machine to:
    collect inventory quantity differences, in a computer, the inventory quantity differences identified in one or more business processes;
    display the collected inventory quantity differences within a graphical user interface, the graphical user interface providing a link between a difference entry and a source document from which the difference was collected; and
    post at least one difference to a reporting system if at least one defined criterion is met.

16. The machine accessible medium of claim 15, wherein the instructions causing the machine to collect cause the machine to:
    segregate internally identified differences into a first subset; and
    segregate externally identified differences into a second subset.

17. The machine accessible medium of claim 15, wherein the instructions causing the machine to display cause the machine to:
    aggregate differences having a common set of attributes as a single line entry in the display.

18. The machine accessible medium of claim 17, wherein the instructions causing the machine to post cause the machine to:
    post the aggregate difference to the reporting system.

19. The machine accessible medium of claim 17, wherein the instructions causing the machine to display cause the machine to:
    display individual differences as well as the aggregate difference.

20. The machine accessible medium of claim 15, wherein the instructions further comprise instruction to cause the machine to:
    filter the differences collected; and
    display only a filtered subset of the differences.

21. The machine accessible medium of claim 15 wherein the instructions further comprise instruction to:
    initiate a workflow for a second user responsive to a comment from a first user.

* * * * *